United States Patent [19]

Kuge

[11] Patent Number: 4,661,824

[45] Date of Patent: Apr. 28, 1987

[54] THERMAL PRINTER FOR PRINTING ON ROUGH SURFACE

[75] Inventor: Akira Kuge, Tokyo, Japan

[73] Assignee: NEC Corporation, Japan

[21] Appl. No.: 754,115

[22] Filed: Jul. 12, 1985

[30] Foreign Application Priority Data

Jul. 13, 1984 [JP] Japan ................................ 59-145400

[51] Int. Cl.[4] ................................................ B01D 15/10

[52] U.S. Cl. ................................ 346/70 PH; 420/120; 346/105

[58] Field of Search .................. 346/76 PH, 105, 106; 400/120; 214/216 PH

[56] References Cited

FOREIGN PATENT DOCUMENTS 154185 12/1985 Japan .............................. 346/76 PH

*Primary Examiner*—Arthur G. Evans

*Attorney, Agent, or Firm*—Sughrue, Mion, Zinn, Macpeak, and Seas

[57] ABSTRACT

A thermal printer which includes a selectively energized thermal head that is located opposite to a platen and is capable of thermally transferring ink from an ink supply onto paper fed between the ink supply and the platen. A heater element is selectively operated, in response to a detector sensitive to the grade of paper, to heat the paper after it has had ink transferred to its surface and is fed out from between the head and the platen.

5 Claims, 7 Drawing Figures

THERMAL PRINTER FOR PRINTING ON ROUGH SURFACE

BACKGROUND OF THE INVENTION

The present invention relates to a thermal printer for printing an image or characters on a print paper by transferring thereto the ink coated on an inked ribbon or an inked film by means of a selectively heated thermal head, and more particularly, to a thermal printer suitable for the printing operation on papers of a rough surface to obtain a high printing quality.

A thermal printer is classified into two types, i.e., a serial printer and a line printer. The serial thermal printer as disclosed in the U.S. Pat. No. 3,855,448 comprises a platen extending in the lateral direction to support a print paper, a thermal head having a plurality of heater elements arrayed in the vertical direction and mounted on a carrier unit to move in parallel with the platen, and an inked ribbon provided on the carrier unit so as to be located between the print paper on the platen and the actuating surface of the thermal head on which the heater elements are provided. The printing operation in a print line is carried out by the selective actuation of the heater elements and lateral movement of the carrier unit. The print paper is fed by one print line after the printing operation is completed in the print line.

A line thermal printer is disclosed in the U.S. patent application Ser. No. 736,889, filed on May 22, 1985, entitled "PRINT PAPER AND INKED FILM FEEDING MECHANISM FOR A THERMAL PRINTER" and assigned to the present assignee. It comprises a platen extending in the lateral direction, a thermal head having a width sufficient to cover the print line length of a print paper and a plurality of heater elements arrayed over the entire width of the thermal head, and an inked film having a width substantially equal to the print line length of the print paper. The print paper and the inked film are movable together and fed into the space between the thermal head and the platen. The printing operation is carried out by the selective actuation of the heater elements and the line feed of the print paper and the inked film.

In either type of the thermal printers, the ink coated on the inked ribbon or film is thermally transferred to the surface of the print paper according to the image or characters to be printed. The heater elements of the thermal head is actuated with the same amount of power and the thermal head is pressed onto the print paper with the same amount of force regardless of the surface quality of the print paper. Where the print paper has a rough surface, however, the ink is difficult to adhere to the minute concaves of the rough surface of the paper. Accordingly, the good printing quality cannot be obtained on the rough surface paper such as the bond paper, with the result that only papers if excellent quality having the smooth surface are used for the thermal printer.

Further, in the conventional thermal printer, the image and characters formed by the thermally transferred ink having undesirable luster due to insufficient permeation of the ink into the print paper.

SUMMARY OF THE INVENTION

Accordingly, an object of the present invention is to provide a thermal printer capable of printing on any kind of print paper including a poor quality paper.

Another object of the present invention is to provide a thermal printer capable of sufficiently permeating the ink of the inked ribbon or film into a print paper.

Still another object of the present invention is to provide a thermal printer capable of reducing the undesirable luster of transferred ink on a print paper.

The thermal printer according to the present invention comprises a thermal head having a plurality of heater elements arrayed on its one surface, said heater elements being selectively energized in accordance with images or characters to be printed; a platen located opposite to said surface of said thermal head; ink holding means passing in front of said surface of said thermal head; means for feeding a print paper to a location between said platen and said ink holding means, where the ink of said ink holding means is thermally transferred onto said print paper, means for feeding said print paper on which said ink has been transferred out of said location and heater means for heating said print paper fed out of said location.

BRIEF DESCRIPTION OF THE DRAWINGS

The above-mentioned and other objects, features and advantages of the present invention will be better understood from the following detailed description of a preferred embodiment of the present invention taken in conjunction with the accompanying drawings, wherein.

DESCRIPTION OF THE PREFERRED EMBODIMENT

Figure 1:
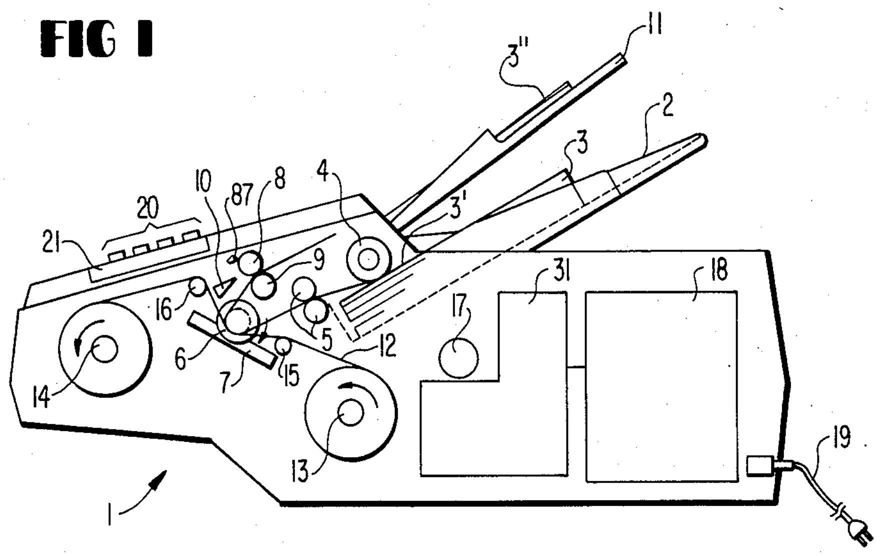
FIG. 1 is a sectional view of a thermal printer according to an embodiment of the present invention.
Figure 2:
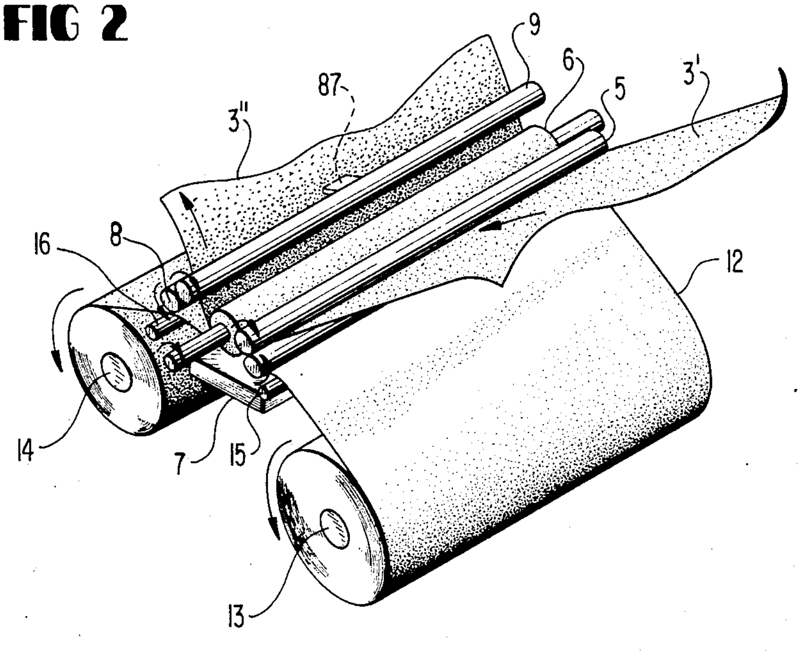
FIG. 2 is a perspective view showing the positional relationship of an inked film, a print paper and a thermal head shown in FIG. 1.

Referring to FIGS. 1 and 2, a line thermal printer 1 according to an embodiment of the present invention has a sheet hopper 2 provided with a plurality of print paper 3. A pick up roller 4 picks up the upper paper 3' of the stacked papers 3 and advances the paper 3' such that the leading edge thereof is inserted between the contact portion of feed rollers 5. The feed rollers 5 feed the paper 3' to the gap between a platen roller 6 and a thermal head 7. As well known in the art, the thermal head 7 has a plurality of heater elements arrayed along its width wise direction on the surface opposite to the platen 6. The paper 3' is wound around the platen 6 about by half turn and subjected to a thermal printing operation. Then, the paper 3' is removed from the platen 6 and inserted between a heater roller 8 and a pressure roller 9 by guidance of the guide member 10. The heater roller 8 heats the printed surface of the paper 3''. The rollers 8 and 9 further advance the paper 3'' to a sheet stacker 11 for stacking the printed paper 3''.

Ink for the printing process is provided by an inked film 12, which has an inked layer of several microns thick formed on the surface of a base film. The film is drawn out of a supply spool 13, passes between the platen 6 and the thermal head 7 and is taken up by a take-up spool 14. Guide shafts 15 and 16 are located on the feed route of the inked film 12 so as to press the inked film 12 against the surface of the platen 6. The inked film 12 is located between the paper 3' on the platen 6 and the thermal head 7.

A feed motor 17 mechanically engages the pick up roller 4, one of the feed rollers 5, the platen 6, the heater roller 8, and the take-up spool 14 (detail is not shown) to rotate them. A controller 18 controls the rotation of the feed motor 17 such that the above-mentioned rollers feed the paper 3' in synchronization with the printing operation. The controller 18 also controls the actuation of the heater elements of the thermal head 7 in accordance with the character codes and the printing instruction given from a host computer (not shown) via a signal line 19.

Selecting switches 20 are provided on a operating panel 21 to be manually operated by a operator in accordance with the quality of the print paper 3 to be utilized in the printer 1. As described later, the printer includes an electric power source 31 which is controlled by the controller 18 in response to the state of the swtiches 20 such that the temperature of the heater roller 8 is variable in accordance with the quality of the print paper 3, and the controlled electric power is applied to the heater roller 8.

The quality of the paper can be represented by the surface roughness of the print paper which is measured by the Beck method, as well known in the art. In this method, the surface roughness of the paper is measured by placing on the paper a cup like container having a certain capacity and containing air at a certain pressure. The standard of measurement is the amount of time required for the pressure within the cup to reach an ambrent level. For instance, the high quality paper for use in the conventional thermal printer (hereinafter, it is called first kind of paper) has a surface roughness of 150 to 300 sec. The continuous paper for use in the impact printer (a second kind of paper) has that of 40 to 50 sec, and the cut sheet for use in the Xerox-type copier (a third kind of paper) has that of 20 to 30 sec. The bond paper (a fourth kind of paper) has that of 10 to 15 sec.

Figure 3:
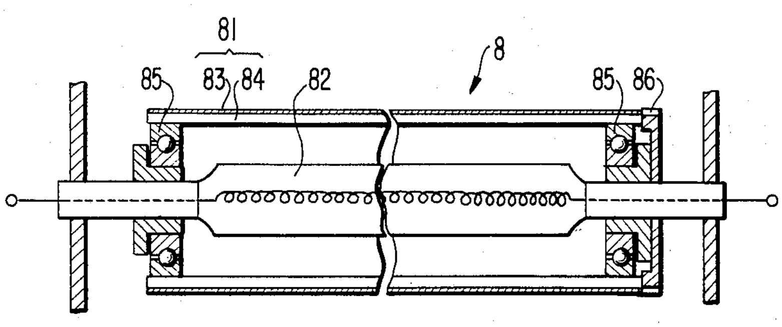
FIG. 3 is a sectional view of a heater roller used in the thermal printer shown in FIG. 1.

Referring to FIG. 3, the heater roller 8 comprises an outer cylinder 81 and a halogen lamp 82 located in the cylinder 81. The cylinder 81 has a silicon rubber 83 coated on a outer surface of an aluminum cylinder 84, and is rotatably connected to the both sides of the halogen lamp 82 via ball bearings 85. The two ends of the halogen lamp 82 is fixed to the printer frame and the outer cylinder 81 is rotated around the lamp 82 by the motor 17 which engages the gear 86 fixed one end of the cylinder 81. The halogen lamp 82 is supplied with the electric energy by the power source 31 to heat the cylinder 81.

Figure 4:
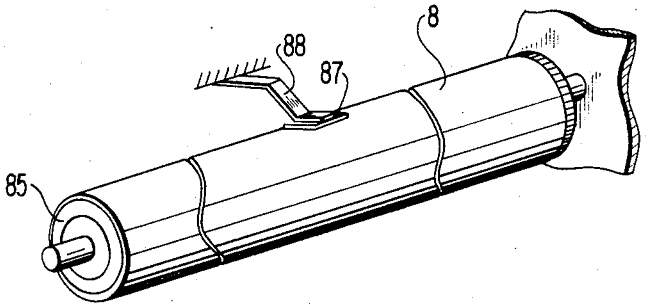
FIG. 4 is a perspective view of a thermistor and the heater roller shown in FIG. 3.

As shown in FIG. 4, a thermistor 87 is provided on the surface of the heater roller 8 at its longitudinally center portion for detecting the surface temperature of the heater roller 8. The thermistor 87 is pressed against the surface of the roller 8 by a spring plate 88.

Figure 5:
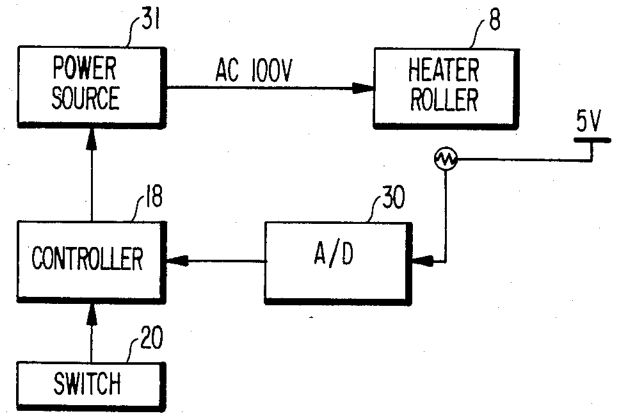
FIG. 5 is a block diagram of a circuit for heat control of the heater roller shown in FIG. 3.

Referring to FIG. 5, the output of the thermistor 87 is transerred to an analog to digital converter 30 and converted to the digital data which is then supplied to the controller 18. One of the three predetermined values of temperatures for the heater roller 8 is set in the controller 18 by the switches 20. The controller 18 compares the digital data from the A/D convertor 30 with the set value of the predetermined temperature and actuates the power source 31 when the digital data is lower than the set value. The power source 31 supplies a voltage of 100 V to the heater roller 8 during the period determined by the controller 18. Therefore, the surface temperature of the heater roller 8 is kept constant at the set value.

Figure 6A:
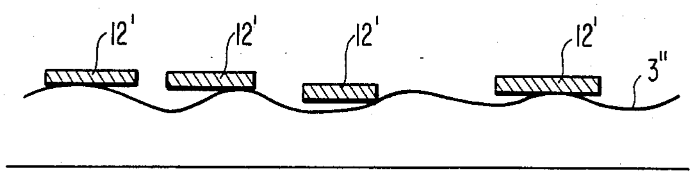
FIGS. 6A and 6B illustrate the relationships between the surface of a print paper and the ink transferred thereto before and after a heating operation, respectively.
Figure 6B:
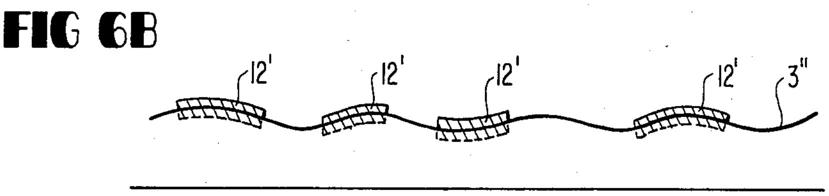

When the first kind of paper is to be utilized, an operator turns on one of the switches 20. The controller 18 recognizes the state of the switches and does not actuate the power source 31 in this case. The heater roller 8 is not heated. When the second kind of paper is to be utilized, the operator turns on another one of the switches 20. The value of temperature is set at 130° C. in the controller 18 and the surface temperature of the heater roller 8 is kept at 130° C. Therefore, as shown in FIGS. 6A and 6B, the printed paper 3" to which the ink 12' has been selectively transferred to the surface of the paper 3" by the thermally printing operation is further heated by the heater roller 8 and the ink 12' transferred on the surface of the paper 3" is permeated into the paper 3" also in the concaves of its rough surface.

When the third or fourth kind of paper is to be utilized, the corresponding one of the switches 20 is operated and the value of temperature is set at 150° C. or 180° C., respectively. Accordingly, the printed paper 3" is heated by appropriate temperature in accordance with its surface roughness so as to sufficiently permeate the ink 12' into the rough surface of the paper 3". Further, since the surface of the ink 12' transferred on the paper 3" is melted by the heater roller 8, its undesirable luster is reduced.

In this embodiment, the heater roller 8 is not heated when the first kind of paper is utilized. However, it may be heated at 100° C. in order to reduce the undesirable luster of the transferred ink 12'. The heater roller 8 and the controller 18 according to the invention is also applicable to a serial thermal printer.

As described above, according to the present invention, the print paper on which the images or characters are formed by the thermal head is heated by the heater roller. Therefore, the ink sufficiently permeates into the surface of the print paper with the result that the printing quality is increased.

What is claimed is:

1. A thermal printer suitable for printing on several kinds of paper including rough-surface paper and smooth-surface paper, comprising a thermal head including a plurality of heater elements arranged on its one surface, a platen located opposite to said surface of said thermal head, ink holding means passing in front of said surface of said thermal head, means for indicating the kind of said paper to be printed by said thermal printer, first feeding means for feeding said paper to a location between said platen and said ink holding means, means for selectively energizing said heater elements whereby the ink of said ink holding means is thermally transferred onto said paper, second feeding means for feeding the paper out of said location after said ink has been transferred thereto, heater means adapted to receive said paper and to heat said paper fed out of said location, and control means connected to said indicating means for controlling the temperature of said heater elements in accordance with the kind of said paper, said control means determining said temperature of said heater means to be high level when the kind of said paper is of rough surface paper and to be low level when the kind of said paper is of smooth-surface paper.

2. The thermal printer as claimed in claim 1, further comprising sensor means for detecting the temperature of said heater means and said control means being responsive to said sensor means and controlling said temperature to be kept at said high or low level.

3. The thermal printer as claimed in claim 1, wherein said second feeding means includes a first roller and a second roller physically aligned and displaced apart in a manner sufficient to receive and transport said printed paper there between and said heater means includes a heat source disposed within said first roller.

4. The thermal printer as claimed in claim 3, wherein said first roller comprises an outer cylinder and said heater includes a lamp means located inside of said outer cylinder for producing the heat, said outer cylinder being connected to a rotary motor to rotate around said lamp means.

5. The thermal printer as claimed in claim 1, wherein said control means inactivates said heater means when the kind of said paper is of very smooth surface.

* * * * *